US008614741B2

(12) United States Patent
Carlbom et al.

(10) Patent No.: US 8,614,741 B2
(45) Date of Patent: Dec. 24, 2013

(54) METHOD AND APPARATUS FOR INTELLIGENT AND AUTOMATIC SENSOR CONTROL USING MULTIMEDIA DATABASE SYSTEM

(75) Inventors: Ingrid Birgitta Carlbom, Summit, NJ (US); Yves D. Jean, New York, NY (US); Agata Opalach, Antibes (FR); Gopal S. Pingali, Mohegan Lake, NY (US)

(73) Assignee: Alcatel Lucent, Paris (FR)

( * ) Notice: Subject to any disclaimer, the term of this patent is extended or adjusted under 35 U.S.C. 154(b) by 2322 days.

(21) Appl. No.: 10/403,443

(22) Filed: Mar. 31, 2003

(65) Prior Publication Data

US 2004/0194129 A1    Sep. 30, 2004

(51) Int. Cl.
*H04N 7/18* (2006.01)
(52) U.S. Cl.
USPC .......................................................... 348/143
(58) Field of Classification Search
USPC ...................... 348/143, 152, 154, 169, 208.14
See application file for complete search history.

(56) References Cited

U.S. PATENT DOCUMENTS

| | | | |
|---|---|---|---|
| 5,631,697 A * | 5/1997 | Nishimura et al. ............ | 348/172 |
| 5,764,283 A | 6/1998 | Pingali et al. | |
| 5,966,074 A * | 10/1999 | Baxter ............................ | 340/565 |
| 6,028,626 A * | 2/2000 | Aviv .............................. | 348/152 |
| 6,128,396 A * | 10/2000 | Hasegawa et al. ............. | 382/103 |
| 6,141,041 A | 10/2000 | Carlbom et al. | |
| 6,233,007 B1 | 5/2001 | Carlbom et al. | |
| 6,437,819 B1 * | 8/2002 | Loveland ....................... | 348/143 |
| 6,441,846 B1 | 8/2002 | Carlbom et al. | |
| 6,687,386 B1 * | 2/2004 | Ito et al. ......................... | 382/103 |
| 6,690,374 B2 * | 2/2004 | Park et al. ...................... | 345/427 |
| 6,782,381 B2 * | 8/2004 | Nelson et al. .................. | 707/713 |
| 6,970,183 B1 * | 11/2005 | Monroe ......................... | 348/143 |

OTHER PUBLICATIONS

U.S. Appl. No. 10/167,539, filed Jun. 12, 2002, I.B. Carlbom et al., "Method and Apparatus for Retrieving Multimedia Data Through Spatio-Temporal Activity Maps."
U.S. Appl. No. 10/167,534, filed Jun. 12, 2002, I.B. Carlbom et al., "Instantly Indexed Databases for Multimedia Content Analysis and Retrieval."
U.S. Appl. No. 10/167,533, filed Jun. 12, 2002, I.B. Carlbom et al., "Performance Data Mining Based on Real Time Analysis of Sensor Data."
U.S. Appl. No. 10/062,800, filed Jan. 31, 2002, I.B. Carlbom et al., "Real-Time Method and Apparatus for Tracking a Moving Object Experiencing a Change in Direction."
P.H. Kelly et al., "An Architecture for Multiple Perspective Interactive Video," Proceedings of ACM Multimedia, pp. 201-212, 1995.
R.Y. Tsai, "An Efficient and Accurate Camera Calibration Technique for 3D Machine Vision," Proceedings of the IEEE Conference on Computer Vision and Pattern Recognition, pp. 364-374, 1986.
D. Kato et al. "Development of a High-Performance Camera-Control Device and Its Application to TV Programs," SMPTE Journal, pp. 718-723, Oct. 1999.
"BehaviorTrack, Video Intelligence Module," http://www.loronix.com/library/js/printasp, 7 pages, Mar. 2003.

* cited by examiner

*Primary Examiner* — Christopher S Kelley
*Assistant Examiner* — Christopher Findley
(74) *Attorney, Agent, or Firm* — Ryan, Mason & Lewis, LLP

(57) ABSTRACT

Techniques for intelligent and automatic control of sensors for capturing data associated with real time events. Preferably, the sensors are associated with a multimedia database system. For example, a technique for controlling one or more sensors used to capture data associated with an event comprises the following steps/operations. First, sensor data captured in accordance with the event is processed. Then, the one or more sensors are automatically controlled based on information pertaining to the continual activity of at least one of one or more objects and one or more persons associated with the event in real time obtained using at least a portion of the processed data captured in accordance with the event.

27 Claims, 7 Drawing Sheets

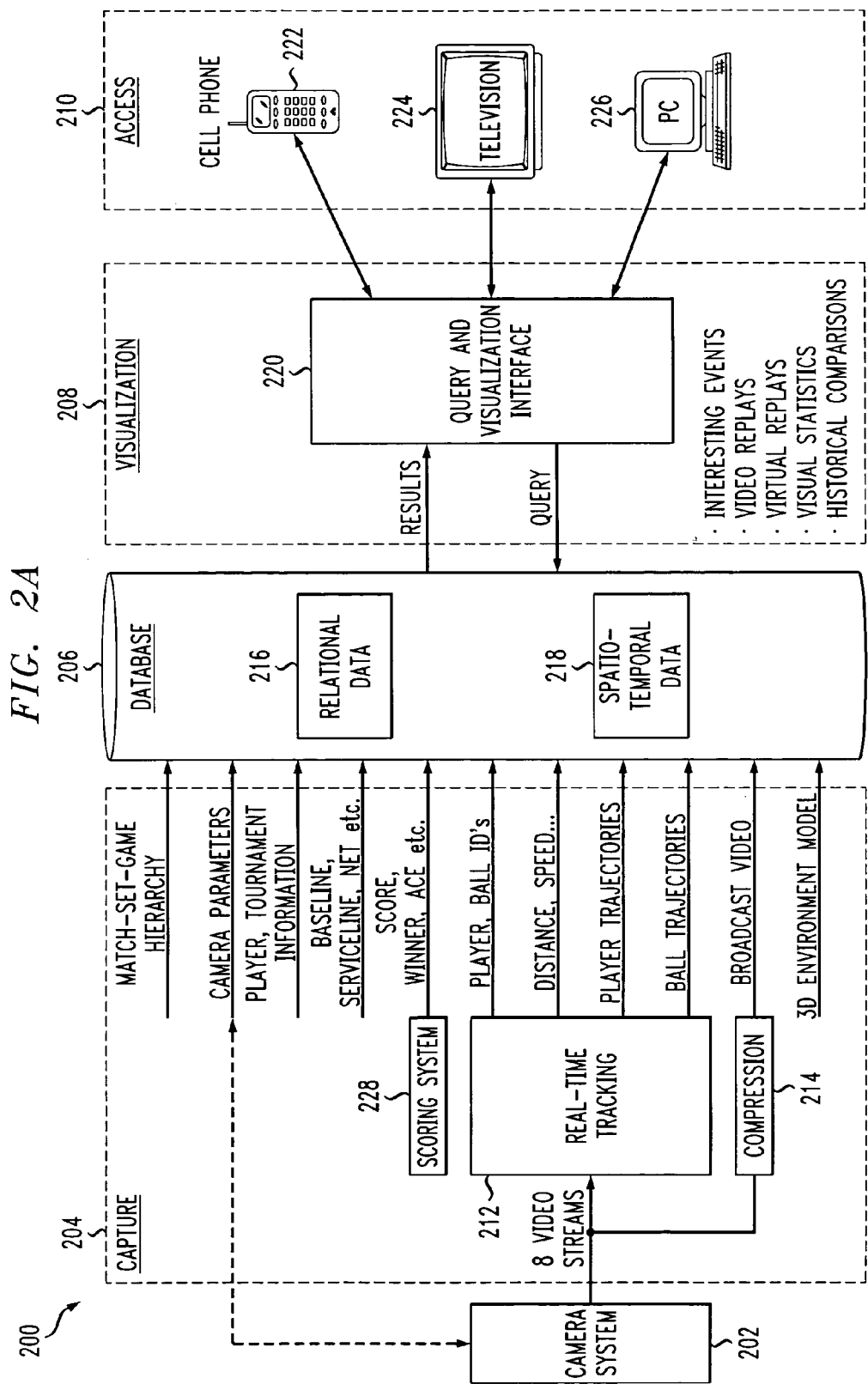

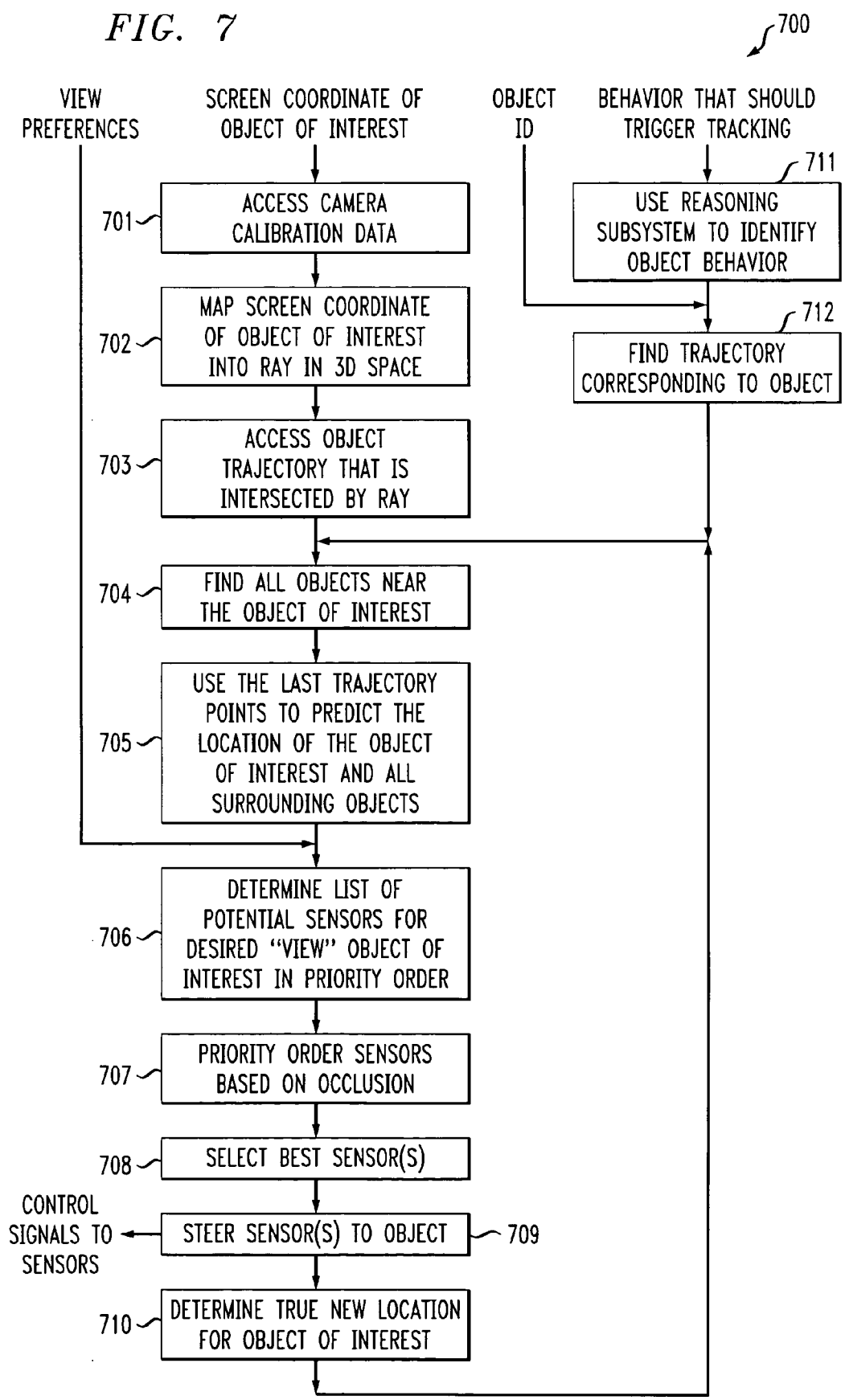

US 8,614,741 B2

METHOD AND APPARATUS FOR INTELLIGENT AND AUTOMATIC SENSOR CONTROL USING MULTIMEDIA DATABASE SYSTEM

CROSS REFERENCE TO RELATED APPLICATIONS

This application relates to U.S. patent applications identified as Ser. No. 10/167,539 entitled "Method and Apparatus for Retrieving Multimedia Data Through Spatio-Temporal Activity Maps;" Ser. No. 10/167,534 entitled "Instantly Indexed Databases for Multimedia Content Analysis and Retrieval;" and Ser. No. 10/167,533 entitled "Performance Data Mining Based on Real Time Analysis of Sensor Data," each filed on Jun. 12, 2002, and the disclosures of which are incorporated by reference herein.

FIELD OF THE INVENTION

The present invention relates to multimedia database systems and, more particularly, to methods and apparatus for intelligent and automatic control of sensors, in conjunction with a multimedia database system, for capturing interesting and important multimedia data associated with real time events.

BACKGROUND OF THE INVENTION

In a multimedia database system that captures and stores multimedia data such as video and audio in accordance with some event, it is known that there is currently no real time automated mechanism for intelligently controlling sensors (e.g., cameras), that is, the selecting and deselecting of sensors, and the setting of sensor parameters to steer the sensors to an object or person of interest, based on reasoning about the continual activity of objects or people in the event.

In the broadcast of sports, for instance, a large crew of trained camera personnel manually control various cameras, while a director continually chooses camera streams and orders switches between the different cameras.

There are security systems (such as BehaviorTrack, which is part of Loronix Video Solutions available from Verint Systems Inc. of Woodbury, N.Y.) that move cameras to preset locations upon a security breach. However, this camera movement is based on preset locations and cannot continually move the sensor to focus on a moving object or person. Furthermore, the decision to steer the camera to a preset location cannot be based on reasoning about the continual activity of objects or people in an event.

There are existing systems that control cameras using microphones. Typically, such technology is used in teleconferencing in order to focus the camera on the current speaker. However, the application of such an approach to other sensors in a multimedia database system that captures and stores multimedia data associated with a real time event is quite limited.

Thus, there exists a need for techniques that overcome the above-mentioned drawbacks by enabling the intelligent and automatic selection and control of sensors associated with a multimedia database system, which captures and stores multimedia data associated with a real time event.

SUMMARY OF THE INVENTION

The present invention provides techniques for intelligent and automatic control of sensors for capturing data associated with real time events. Preferably, the sensors are associated with a multimedia database system.

In one aspect of the invention, a technique for controlling one or more sensors used to capture data associated with an event comprises the following steps/operations. First, sensor data captured in accordance with the event is processed. By way of example, processing may comprise generating motion trajectories of objects and persons associated with the event. Then, the one or more sensors are automatically controlled based on information pertaining to the continual activity of at least one of one or more objects and one or more persons associated with the event in real time obtained using at least a portion of the processed data captured in accordance with the event.

The technique preferably further comprises obtaining one or more user preferences. Then, the one or more user preferences may be utilized in conjunction with at least a portion of the processed captured data to generate one or more signals for controlling the one or more sensors. The one or more user preferences may comprise an object preference, a person preference, a view preference, an object behavior preference and/or a person behavior preference. The behavior preference is preferably based on at least one of spatial or temporal behavior criteria. The spatial criteria preferably pertain to the positions of objects or people relative to the environment of the event or to the object and people positions relative to other people and objects in the environment. The temporal criteria preferably pertain to the object or people movement, historical data relative to earlier movement, or data relative to predicted movement. Behavior may be specified and analyzed in accordance with a reasoning subsystem.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2A is a block diagram illustrating an architecture of an instantly indexed multimedia database system according to a sporting event embodiment of the present invention;

FIG. 7 is a flow diagram illustrating a sensor control methodology according to an embodiment of the present invention.

DETAILED DESCRIPTION OF THE PREFERRED EMBODIMENTS

Figure 1:
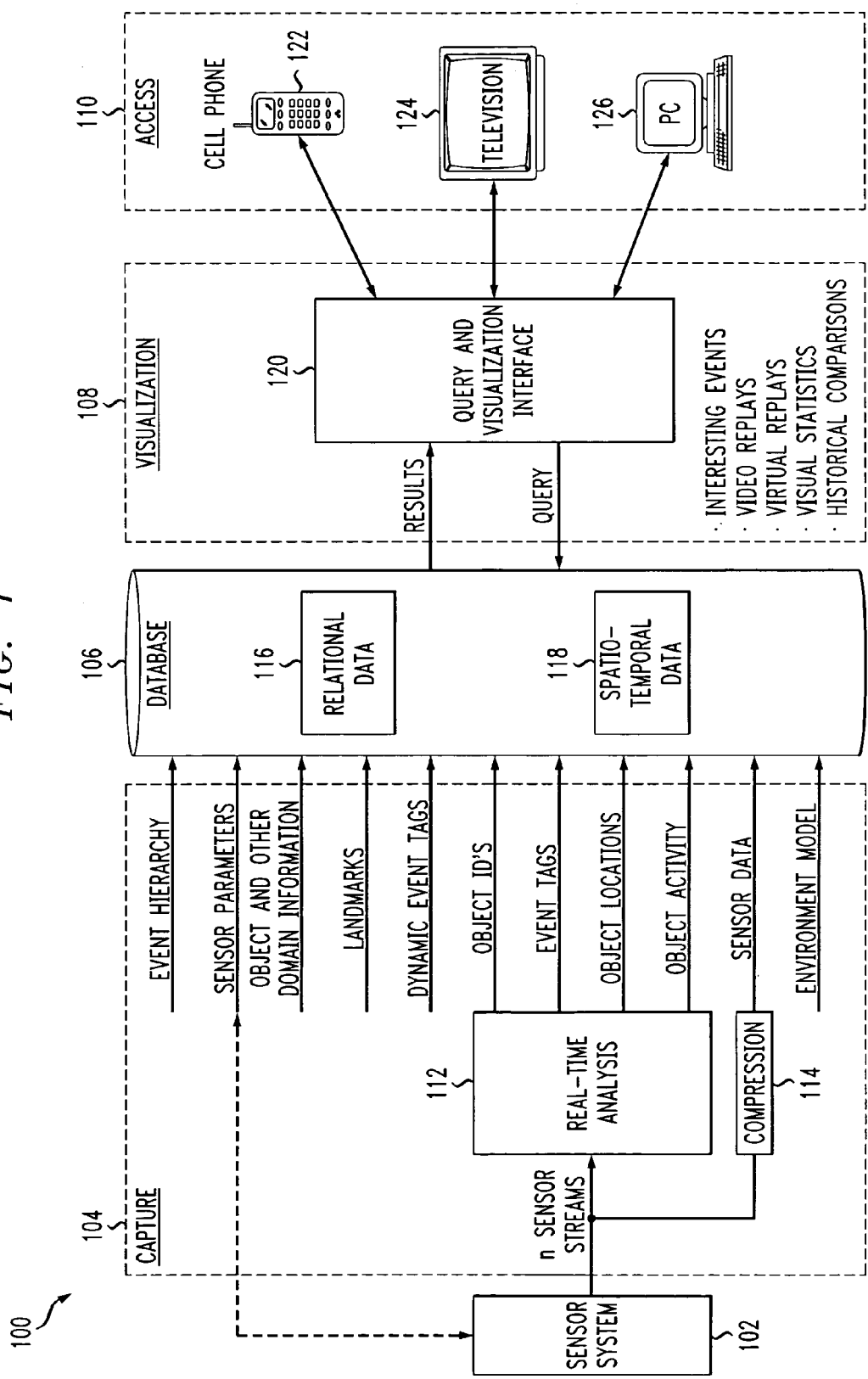
FIG. 1 is a block diagram illustrating a generic architecture of an instantly indexed multimedia database system according to the present invention.

Before an illustrative embodiment of a sensor controller architecture and methodology of the invention is described, a detailed description of an illustrative multimedia database system within which the sensor controller architecture and methodology of the invention may be employed will first be provided. It is to be appreciated that the illustrative multimedia database system which is presented herein is the system described in the above-referenced U.S. patent application identified as Ser. No. 10/167,534 entitled "Instantly Indexed Databases for Multimedia Content Analysis and Retrieval." However, the sensor controller architecture and methodology of the invention may be employed with other systems, including systems other than a multimedia database system.

Thus, for ease of reference, the remainder of the detailed description is organized as follows. Part A describes the illustrative instantly indexed multimedia database system. Part A includes Sections I through VII. Section I presents a generic architecture for an instantly indexed multimedia database system. Section II discusses the instantiation of the architecture in an illustrative sporting event embodiment. A real-time person tracking component of the system is presented in Section III, while an object (non-person) tracking component is presented in Section IV. Section V generally discusses query and visualization interfaces that may be used, while content-based retrieval techniques that may be employed are generally discussed in Section VI. Lastly, Section VII presents an exemplary hardware implementation of an instantly indexed multimedia database system. Then, Part B describes an illustrative embodiment of a sensor controller architecture and methodology according to the present invention.

A. Instantly Indexed Multimedia Database (IIMD) System

1. Architecture of an IIMD System

The IIMD system provides techniques for indexing multimedia data substantially concurrently or contemporaneously with its capture to convert an event such as a real world event into an accessible database in real time. It is to be understood that the term "instantly" is used herein as a preferred case of the substantially concurrent or contemporaneous nature of the indexing techniques with respect to the capture of data. However, while instant indexing (and thus retrieval) of multimedia data is achievable, the IIMD system more generally provides for substantially concurrent or contemporaneous indexing of multimedia data with respect to capture of such data. As is known, non-IIMD indexing and retrieval approaches are not capable of providing such operations substantially concurrent or contemporaneous (e.g., instantly) with the capture of the data.

The following description will illustrate the IIMD system using an exemplary real world sporting event application (namely, a tennis match), in addition to other exemplary real world applications (e.g., surveillance). It should be understood, however, that the IIMD system is not necessarily limited to use with any particular application. The IIMD system is instead more generally applicable to any event in which it is desirable to be able to index and also retrieve multimedia data in substantial concurrence or contemporaneity with its capture or collection.

Accordingly, as will be illustrated below, the IIMD system provides techniques for generating and maintaining an instantly indexed multimedia database of a real world event. Such a database: (a) is created in real time as the real world event takes place; (b) has a rich set of indices derived from disparate sources; (c) stores only relevant portions of the multimedia data; and (d) allows domain-specific retrieval and visualization of multimedia data. Thus, the IIMD system supports both real time or online indexing during the event, as well as the capture of data and indices that support a user's domain-specific queries. The IIMD system may also be configured to support intelligent and automatic sensor control, as described in detail in Part B below.

As mentioned above, most non-IIMD multimedia database systems have been limited to offline indexing on a single stream of post-production material, and to low-level, feature-based indices rather than a user's semantic criteria. While many important methods have been developed in this context, the utility of these systems in real world applications is limited. Advantageously, the IIMD system provides techniques that index one or more multimedia data streams in real time, or even during production, rather than post-production.

Referring initially to FIG. 1, a block diagram illustrates a generic architecture of an instantly indexed multimedia database (IIMD) system. As shown, the system 100 comprises a sensor system 102, a capture block 104, a storage block 106, a visualization block 108 and an access block 110. The capture block 104, itself, comprises a real time analysis module 112 and a compression module 114. The storage block 106, itself, comprises a relational database structure 116 and a spatio-temporal database structure 118. The visualization block 108, itself, comprises a query and visualization interface 120. The access block 110, itself, comprises devices that may be used to access the system 100, for example, a cellular phone 122, a television 124 and a personal computer 126.

While not expressly shown in FIG. 1, it is to be understood that blocks such as the capture block, storage block and the visualization block may have one or more processors respectively associated therewith for enabling the functions that each block performs. Each device associated with the access block, itself, may also have one or more processors associated therewith. Also, all or portions of the operations associated with the visualization block may be implemented on the user devices of the access block. The IIMD system is not limited to any particular processing arrangement. An example of a generalized processing structure will be described below in the context of FIG. 5.

In general, the generic system operates as follows. The capture block 104 captures data that will be stored and/or accessed in accordance with the system 100. By "capture," it is generally meant that the system both collects and/or processes real time data and accesses and/or obtains previously stored data. For example, the capture block 104 may obtain pre-existing data such as event hierarchy data, sensor parameter data, object and other domain information, landmarks, dynamic event tags and environmental models. Specific examples of these categories of data will be given below in the context of the tennis-based embodiment of the system. It is to be understood that the IIMD system is not limited to these particular categories or to the tennis-specific categories to be given below.

Collection of this data may occur in a variety of ways. For example, the capture block 104 may access this data from one or more databases with which it is in communication. The data may be entered into the system at the capture block 104 manually or automatically. The IIMD system is not limited to any particular collection method. The data may also be obtained as a result of some pre-processing operations. For example, sensor parameters may be obtained after some type of calibration operation is performed on the sensors.

In addition, the capture block 104 obtains n streams of sensor data from the sensor system 102. It is to be understood that this sensor data is captured in real time and represents items (persons, objects, surroundings, etc.) or their actions (movement, speech, noise, etc.) associated with the real world event or events for which the system is implemented. The type of sensor that is used depends on the domain with which the system is being implemented. For example, the sensor data may come from video cameras, infrared cameras, microphones, geophones, etc. At least some of the sensors of the sensor system 102 are preferably controlled in accordance with the intelligent and automatic control techniques of the present invention, as will be described in detail in Part B and in the context of FIGS. 6 and 7.

This sensor data is processed in real time analysis module 112 to generate object locations and object activity information, as will be explained below. Object identifiers or id's (e.g., identifying number jersey number, etc.) of player in a sporting event, employee id number) and event tags (e.g., speed, distance, temperature) may also be output by the module 112. The sensor data is also optionally compressed in compression module 114. Again, specific examples of these categories of processed sensor data will be given below in the context of the tennis-based embodiment of the system. Again, it is to be understood that the IIMD system is not limited to these particular categories or to the tennis-specific categories to be given below.

By way of example, the real time analysis module 112 may implement the person and other object tracking and analysis techniques described in U.S. Pat. Nos. 5,764,283 and 6,233,007, and in the U.S. patent application identified as Ser. No. 10/062,800 filed Jan. 31, 2002 and entitled "Real Time Method and Apparatus for Tracking a Moving Object Experiencing a Change in Direction," the disclosures of which are incorporated by reference herein. Exemplary tracking techniques will be further discussed below in Sections III and IV.

It is to be understood that the data collected and/or generated by the capture block 104, and mentioned above, includes both static (non-changing or rarely-changing) data and dynamic (changing) data. For example, event hierarchy information may likely be static, while object/person location information may likely be dynamic. This dynamic and static information enters the database system via the capture block 104 and is organized as relational and spatio-temporal data in the structures 116 and 118 of the storage block 106. While much of the data collected/obtained by the capture block 104 can fit into a relational model, sensor streams, object activity data, and the environment model are not typically amenable to the relational model. This type of data is stored in accordance with a spatio-temporal model.

Dynamic information is derived mostly by real time analysis of data from multiple disparate sensors observing real world activity, e.g., by real time analysis module 112 based on input from sensor system 102. The sensor data streams are also stored in the storage block 106, after compression by compression module 114. The IIMD system is not limited to any particular data compression algorithm. Results of real time analysis typically include identification of interesting objects (e.g., who or what is in the environment), their location, and activity (e.g., what are they doing, how are they moving). Real time analysis can also result in detection of events that are interesting in a domain. However, the architecture does not limit generation of dynamic event tags to real time analysis alone, that is, tags that are derived from the tracking (location, speed, direction). Event tags may come even from semi-automated or manual sources that are available in an application domain, for example, dynamic score data in a sports production setting, or manual input in a security application.

The IIMD system 100 incorporates domain knowledge in a variety of ways. First, design of tables in the relational database is based on the known event hierarchy, and known objects of interest. Second, the system maintains a geometric model of the environment, as well as location of all sensors in relation to this model. Third, the system takes advantage of available sources of information associated with the event domain. Fourth, design of the real time analysis module is based on knowledge of the objects of interest in the domain. Sensor placement can also be based on domain knowledge. Finally, design of the visualization interface is based on knowledge of queries of interest in the domain.

By way of example only, the IIMD approach offers these advantages in data access and storage over non-IIMD content-based media retrieval systems: (1) real-time cross-indexing of all data (e.g., person position, speed, domain-related attributes, and video); and (2) storage of relevant data alone (e.g., only video when a person appears in a surveillance application, or only video when play occurs in a sports application).

As further illustrated in the IIMD system 100 of FIG. 1, the query and visualization interface 120 of the visualization block 108 provides a user accessing the system through one or more of devices 122, 124 and 126 (or similar devices) with the ability to query the database and to be presented with results of the query. In accordance with the interface 120, the user may access information about interesting events in the form of video replays, virtual replays, visual statistics and historical comparisons. Exemplary techniques will be further discussed below in Sections V and VI.

II. Instantiation of IIMD Architecture in Illustrative Embodiment

This section illustrates an embodiment of an IIMD system for use in sports broadcasts, specifically for use in association with a tennis match. As is known, sporting events are the most popular form of live entertainment in the world, attracting millions of viewers on television, personal computers, and a variety of other endpoint devices. Sports have an established and sophisticated broadcast production process involving producers, directors, commentators, analysts, and video and audio technicians using numerous cameras and microphones. As will be evident, an IIMD system finds useful application in such a production process. Further, in Part B, an intelligent and automated system for controlling the cameras and other sensors will be described.

While the following instantiation focuses on tennis, exemplary reference may be made throughout to alternative illustrative domains (e.g., surveillance in factories, parking garages or airports to identify unusual behavior, surveillance in supermarkets to gain knowledge of customer behavior). However, as previously stated, the IIMD system is not limited to any particular domain or application.

In the illustrative tennis-based embodiment, the IIMD system analyzes video from one or more cameras in real time, storing the activity of tennis players and a tennis ball as motion trajectories. The database also stores three dimensional (3D) models of the environment, broadcast video, scores, and other domain-specific information.

Advantageously, the system allows various clients, such as television (TV) broadcasters and Internet users, to query the database and experience a live or archived tennis match in multiple forms such as 3D virtual replays, visualizations of player strategy and performance, or video clips showing customized highlights from the match.

Referring now to FIG. 2A, a block diagram illustrates an architecture of an instantly indexed multimedia database system according to a sporting event embodiment. As mentioned, the particular sporting event with which the system is illustrated is a tennis match. Again, however, it is to be appreciated that the IIMD system is not limited to use with this particular real world event and may be employed in the context of any event or application.

It is to be understood that blocks and modules in FIG. 2A that correspond to blocks and modules in FIG. 1 have reference numerals that are incremented by a hundred. As shown, the system 200 comprises a camera system 202, a capture block 204, a storage block 206, a visualization block 208 and an access block 210. The capture block 204, itself, may comprise a real time tracking module 212, a compression module 214 and a scoring module 228. The storage block 206, itself, comprises a relational database structure 216 and a spatio-temporal database structure 218. The visualization block 208, itself, comprises a query and visualization interface 220. The access block 210, itself, comprises devices that may be used to access the system 200, for example, a cellular phone 222, a television 224 and a personal computer 226.

In general, the system 200 operates as follows. The capture block 204 captures data that will be stored and/or accessed in accordance with the system 200. Again, "capture" generally means that the system both collects and/or processes real time data and accesses and/or obtains previously stored data. The categories of captured data illustrated in FIG. 2A are domain-specific examples (i.e., tennis match-related) of the categories of captured data illustrated in FIG. 1.

For example, the capture block 204 may include match-set-game hierarchy data (more generally, event hierarchy data), camera parameter data (more generally, sensor parameter data), player and tournament information (more generally, object and other domain information), baseline, service line, net information (more generally, landmarks), score/winner/ace information (more generally, dynamic event tags) and 3D environment models (more generally, environmental models). Dynamic score/winner/ace information may be obtained from scoring system 228 available in a tennis production scenario. Again, as mentioned above, collection of any of this data may occur in a variety of ways.

In addition, as shown in this particular embodiment, the capture block 204 obtains eight streams of video data from the camera system 202. It is to be appreciated that the eight video streams are respectively from eight cameras associated with the camera system 202 synchronized to observe a tennis match. Control of camera system 202 will be described in Part B. Preferably, two cameras are used for player tracking and six for ball tracking. Of course, the IIMD system is not limited to any number of cameras or streams. This video data is processed in real time tracking module 212 to generate player and ball identifiers (more generally, object id's), distance, speed and location information (more generally, event tags), player and ball trajectories (more generally, object location and object activity). The video data is also compressed in compression module 214.

As mentioned above, the real time tracking module 212 may implement the player and ball tracking and analysis techniques described in the above-referenced U.S. Pat. Nos. 5,764,283 and 6,233,007, and in the above-referenced U.S. patent application identified as Ser. No. 10/062,800 filed Jan. 31, 2002 and entitled "Real Time Method and Apparatus for Tracking a Moving Object Experiencing a Change in Direction." The tracking module 212 generates (e.g., derives, computes or extracts from other trajectories) and assigns a player trajectory to the appropriate player by taking advantage of domain knowledge. The module 212 preferably uses the rules of tennis and the current score to figure out which player is on which side of the court and seen by which camera. Exemplary tracking techniques will be further discussed below in Sections III and IV.

Again, it is to be understood that the data collected and/or generated by the capture block 204, and mentioned above, includes both static (non-changing or rarely-changing) data and dynamic (changing) data. This dynamic and static information enters the database system via the capture block 204 and is organized as relational and spatio-temporal data in the structures 216 and 218 of the storage block 206. It is to be appreciated that much of the data collected by the capture block 204 can fit into a relational model, e.g., match-set-game hierarchy data, camera parameters, player and tournament information, baseline, service line, net information, score, winner ace information, player ball id's, distance speed information. However, player and ball trajectories, broadcast video (one or more broadcast streams that are optionally compressed by compression module 214) and the 3D environment model are not amenable to the relational model. This type of data is stored in accordance with a spatio-temporal model.

The storage block 206 employs a relational database to organize data by the hierarchical structure of events in tennis, as defined in Paul Douglas, "The Handbook of Tennis," Alfred and Knopf, New York, 1996, the disclosure of which is incorporated by reference herein. A tennis "match" consists of "sets" which consist of "games," which, in turn, consist of "points." Each of these events has an associated identifier, temporal extent, and score. The system associates trajectories $X_{p1}(t)$, $X_{p2}(t)$, $X_b(t)$ corresponding to the two players and the ball with every "point," as "points" represent the shortest playtime in the event hierarchy. Each "point" also has pointers to video clips from the broadcast production. The relational database structure 216, preferably with a standard query language (SQL) associated therewith, provides a powerful mechanism for retrieving trajectory and video data corresponding to any part of a tennis match, as will be further discussed in Section VII. However, the relational structure does not support spatio-temporal queries based on analysis of trajectory data. Thus, the system 200 includes a spatio-temporal analysis structure 218 linked to the relational structure 216.

Further, query and visualization interface 220 preferable resides in and is displayed on a client device (e.g., cellular phone 222, television 224, personal computer 226) and performs queries on the database and offers the user a variety of reconstructions of the event as discussed in Section VI. This interface may be tailored to the computational and bandwidth resources of different devices such as a PC with a broadband or narrowband Internet connection, a TV broadcast system, or a next generation cellular phone.

Figure 2B:
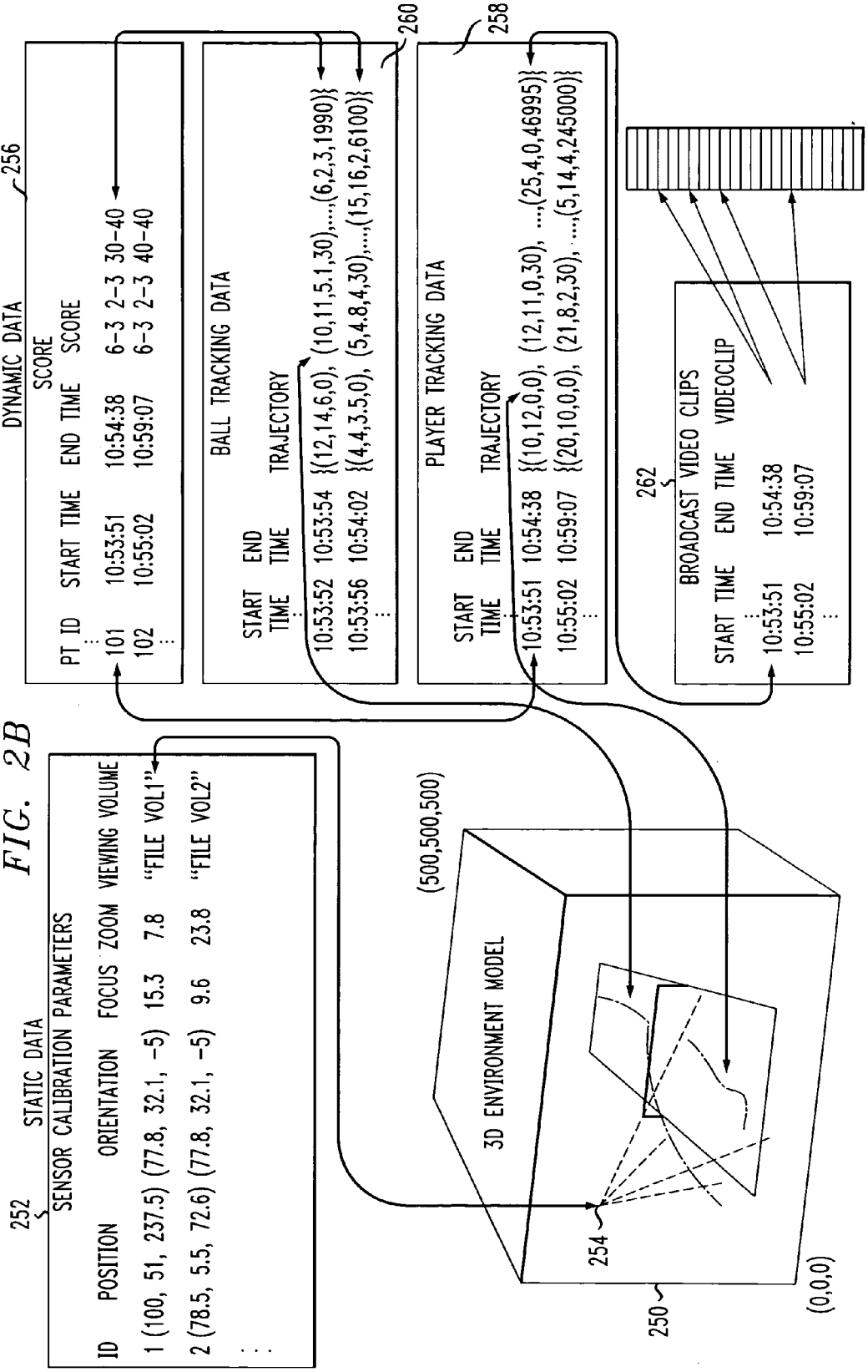
FIG. 2B is a diagram illustrating an indexing methodology used in a multimedia database system according to an embodiment of the present invention.

Referring now to FIG. 2B, a diagram illustrates an indexing methodology used in a multimedia database system according to an illustrative embodiment. More particularly, this diagram illustrates how data from multiple disparate sources is indexed or, more specifically, cross-indexed, in real time in an IIMD system.

As shown in FIG. 2B, the IIMD system has both static (on the left in the figure) and dynamic data (on the right in the figure). In the tennis example, the static data includes a 3D model 250 of the environment including the court. The static data also includes a table 252 of parameters of each sensor in the environment. In this example, table 252 has calibration parameters of cameras in the environment. Each camera has a unique identifier (ID) and its calibration parameters include its 3D position, orientation, zoom, focus, and viewing volume. These parameters map to the 3D environment model 250, as illustrated for camera 254 in FIG. 2B.

Dynamic data arrives into the IIMD database during a live event. In the tennis example, the dynamic data includes the score, player and ball tracking data (tracking data for one player and for the ball is shown in the figure), and video clips from one or more sources. As illustrated in FIG. 2B, the IIMD system dynamically cross-indexes the disparate static and dynamic data. For example, the score table 256 records the score for each point in a tennis match. This table has an ID for each point, the starting and ending times for the point, and the corresponding score in the tennis match. Simultaneously the tracking system inputs trajectory data into the database. The trajectory data is recorded with starting and ending times, and the corresponding sequence of spatio-temporal coordinates. The starting and ending times, or the temporal duration of a trajectory, help in cross-indexing the trajectory with other data associated with the same temporal interval.

In FIG. 2B, the player tracking data from table 258 and score for point 101 (in table 256) are cross-indexed by the common temporal interval. Similarly trajectories of the ball and the other player can be cross-indexed. The example also shows two ball tracking segments in table 260 cross-indexed to the score for point 101 (again, in table 256) as they occur during the same temporal interval. The spatial coordinates in the trajectory data also relate the trajectory data to the 3D environment model 250, and map trajectories to 3D space as shown in FIG. 2B.

The mapped trajectory in the 3D model is then related to one or more sensors within whose viewing volume the trajectory lies, as shown in FIG. 2B for the player trajectory. This is used, for example, to access video from a particular camera which best views a particular trajectory. The temporal extent of a trajectory also aids in indexing a video clip corresponding to the trajectory. As shown in FIG. 2B, the player trajectory data starting at 10:53:51 to 10:54:38 is used to index to the corresponding video clip (table 262) from the broadcast video.

As illustrated in this example, the IIMD system cross-indexes disparate data as it arrives in the database. For example, the score for a point with ID 101 is automatically related to the corresponding trajectories of the players and the ball, the exact broadcast video clip for point 101, the location of the trajectories of the players and the ball in the 3D world model, and the location, orientation and other parameters of the sensor which best views a player trajectory for the point 101. With the ability to automatically index the relevant video clips, the IIMD is also capable of storing just the relevant video alone while discarding the rest of the video data.

Given the instantly indexed real time data, an IIMD system is capable of providing many advantageous features. For example, reconstructions of the real world event range from high fidelity representations (e.g., high quality video) to a compact summary of the event (e.g., a map of players' coverage of the court). The IIMD system can also produce broadcast grade graphics. The system can generate, by way of example, VRML (Virtual Reality Model Language) models of the environment and changes thereto throughout an event. The system 200 can also support integrated media forms (e.g., video streams, VRML environments, and audio) using standards such as, for example, MPEG-4 (Motion Picture Expert Group 4). Furthermore, the system 200 can produce low-bandwidth output such as scoring or event icons for cellular phones and other devices.

As mentioned above, it is to be appreciated that the IIMD system extends to various applications other than sports. Moving to a different application involves: (a) setting up a relational database structure based on the event hierarchy for the domain; (b) defining an environment model and sensor placement with respect to the model; (c) development of real time analysis modules that track dynamic activity of objects of interest; and (d) design of a query and visualization interface that is tailored to the database structure and the domain.

Given the descriptions of the IIMD system provided herein, one of ordinary skill in the art will realize how to extend the system to other applications.

Sports applications have the advantage of a well-defined structure that makes it easier to extend this approach. For example, just as a tennis match is organized as a series of "points," baseball has a series of "pitches," basketball and American football have sequences of "possessions," and cricket has a hierarchy of "balls," "overs," "innings," etc. Thus, steps (a), (b), and (d) above are relatively straightforward in moving to other sports, and to even less structured domains such as customer activity surveillance and analysis in retail stores where the database can be organized in terms of entries and exits into different areas, time spent at different products, etc.

A main portion of the task of implementing an IIMD system in accordance with other applications focuses on step (c) above, i.e., developing appropriate real time analysis techniques. However, one of ordinary skill in the art will readily appreciate how this may be done. By way of one example, this may be accomplished in accordance with the person and object tracking techniques described below.

III. Tracking Motion of Person

As mentioned above, an IIMD system preferably performs real time analysis/tracking on data received by sensors placed in the domain environment. Depending on the application, the sensor system may capture objects such as people in the environment. The application may call for the tracking of the motion of such people. Tracking of person motion may be accomplished in a variety of ways. As mentioned above, person motion tracking may be performed in accordance with the techniques described in the above-referenced U.S. Pat. No. 5,764,283. However, other methodologies may be used.

In the context of the tennis embodiment, a description is given below of a preferred methodology for performing player motion tracking operations that may be implemented by the real time tracking module 212 of the IIMD system 200. However, it is to be understood that one of ordinary skill in the art will realize how these operations may be applied to other domains.

In a preferred embodiment, an IIMD system uses visual tracking to identify and follow the players preferably using two cameras, each covering one half of the court (in a surveillance application, there will typically be more cameras, the number of cameras being selected to cover all space where a person or persons are moving). The desired outputs of the player tracking system are trajectories, one per player, that depict the movement of the player (in a surveillance application, there may be one trajectory per individual). It is challenging to obtain a clean segmentation of the player from the video at all times. Differentiating the player from the background, especially in real time, is complicated by changing lighting conditions, wide variations in clothing worn by players, differences in visual characteristics of different courts, and the fast and non-rigid motion of the player. The central problem is that real-time segmentation does not yield a single region or a consistent set of regions as the player moves across the court. In addition, the overall motion of the body of the player has to be obtained in spite of the non-rigid articulated motion of the limbs.

Figure 3:
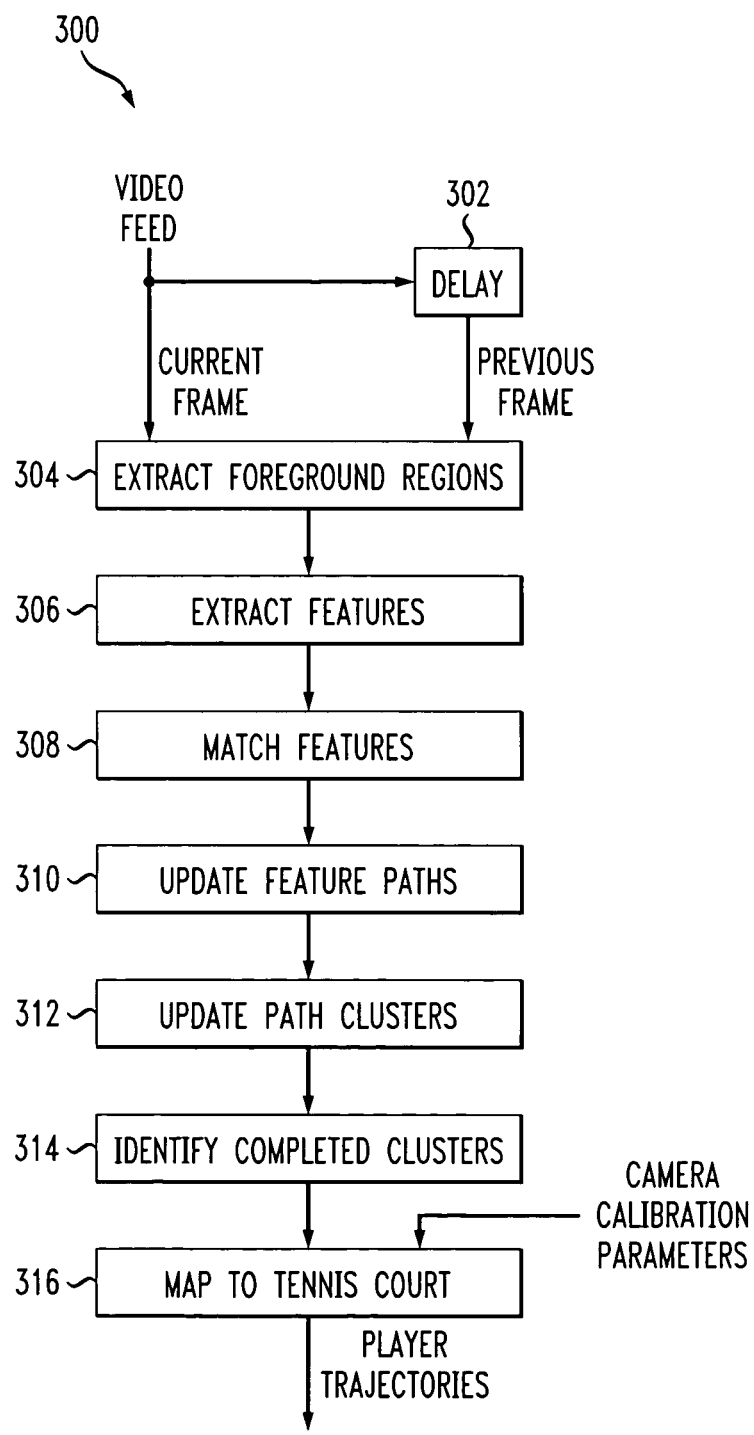
FIG. 3 is a flow diagram illustrating a player tracking method according to an embodiment of the present invention.

In order to robustly obtain player trajectories, the system tracks local features and derives the player trajectory by dynamically clustering the paths of local features over a large number of frames based on consistency of velocity and bounds on player dimensions. FIG. 3 summarizes the steps involved in the player tracking system. This methodology may be implemented by the real-time tracking module 212.

Referring now to FIG. 3, a flow diagram illustrates a player tracking method 300 according to an illustrative embodiment. Input to the method 300 includes the current frame of a particular video feed, as well as the previous frame which has been previously stored (represented as delay block 302).

First, in step 304, foreground regions are extracted from the video. This is accomplished by extracting the regions of motion by differencing consecutive frames followed by thresholding resulting in s binary images. This is a fast operation and works across varying lighting conditions. A morphological closing operation may be used to fill small gaps in the extracted motion regions. Such an operation is described in C. R. Giardina and E. R. Dougherty, "Morphological Methods in Image and Signal Processing," Prentice Hall, 1988, the disclosure of which is incorporated by reference herein. Thus:

$$B_t = (H_T(I_t - I_{t-1}) \oplus g) \ominus g \quad (1)$$

where $B_t$ is a binary image consisting of regions of interest at time t, $I_t$ is the input image at time t, $H_T$ is a thresholding operation with threshold T, g is a small circular structuring element, and $\oplus$, $\ominus$ indicate morphological dilation and erosion operations, respectively. Consistent segmentation of a moving player is not obtained even after this operation. The number of regions per player change in shape, size and number across frames.

Next, in step 306, the method determines local features on the extracted regions in each frame. The local features are the extrema of curvature on the bounding contours of the regions. In step 308, the method matches features detected in the current frame with the features detected in the previous frame. This involves minimizing a distance measure $D_f$ given by:

$$D_f = k_r \delta r^2 + k_\theta \delta \theta^2 + k_\kappa \delta \kappa^2 \quad (2)$$

where $\delta r$ is the Euclidean distance between feature positions, $\delta \theta$ is the difference in orientation of the contours at the feature locations, $\delta \kappa$ is the difference in curvature of the contours at the feature locations and $k_r$; $k_\theta$; $k_\kappa$ are weighting factors. A feature path consists of a sequence of feature matches and indicates the motion of a feature over time. The parameters of a path $\Phi$ include $\{x, y, t, l, \mu_x, \mu_y, \sigma_x, \sigma_y\}$ where x, y, t are vectors giving the spatio-temporal coordinates at each sampling instant, l is the temporal length of the path, and $\mu_x, \mu_y$ are, respectively, the mean x and y values over the path and $\sigma_x, \sigma_y$ are, respectively, the variances in x and y values over the path. It is to be appreciated that there are numerous feature paths of varying lengths. These paths are typically short-lived and partially overlapping.

In order to obtain the player trajectory, the method dynamically groups these paths into clusters. This is accomplished by updating the feature paths (step 310), updating the path clusters (step 312) and identifying completed clusters (step 314), as explained in detail below.

At each time instant, we group feature paths with sufficient temporal overlap to form clusters. Multiple clusters are also grouped into a single cluster in a similar fashion. The parameters of a cluster $\Gamma$ include $\{x, y, t, f, l, p, \mu_x, \mu_y, \sigma_x, \sigma_y\}$ where f is a vector that gives the number of features contributing to a cluster at each instant, p is the total number of paths contributing to the cluster, $(\mu_x, \mu_y)$ indicate the mean displacement of contributing features from the cluster coordinates and $(\sigma_x, \sigma_y)$ indicate the variance in displacements. We group two clusters or a path and a cluster when they are close enough according to a distance measure $D_\Gamma$ given by:

$$D_\Gamma = \lambda_x \Delta \sigma_x + \lambda_y \Delta \sigma_y + \lambda_\tau \Delta_\tau \quad (3)$$

where $\Delta \sigma_x, \Delta \sigma_y$ are the maximum change in variances of x and y displacements of features resulting from merging the clusters, $\Delta \tau$ is the normalized squared sum of the difference in orientations of the velocity vectors along the trajectories corresponding to the two clusters, and $\lambda_x, \lambda_y, \lambda_\tau$ are weighting factors based on bounds on the size of a player.

The clustering algorithm is capable of tracking several objects in real time. The motion of the body of the player results in a single dominant cluster in the tennis application. Motion of individual limbs of the player results in short-lived clusters that are distinguished from the main cluster. The smaller clusters can be analyzed to derive more information on the motion of individual limbs of a player, or the motion of the racket.

Sometimes, a player is not the only individual moving in the scene, even with a restricted view. Line judges also move, sometimes more than the players. Thus, the method employs domain knowledge on relative positions to distinguish player trajectories from those of line judges. In step 316, the method maps player trajectories from the image plane to the court ground plane using camera calibration parameters, see, e.g., R. Y. Tsai, "An Efficient and Accurate Camera Calibration Technique for 3D Machine Vision," Proceedings of the IEEE Conference on Computer Vision and Pattern Recognition, pp. 364-374, 1986, the disclosure of which is incorporated by reference herein.

In a surveillance application, the result may be more than one trajectory, one trajectory for each individual in the area under surveillance. In order to identify the paths with particular individuals, in particular when such paths intersect or when a path has a discontinuity resulting from the tracked individual being temporarily occluded by another individual or object, color, texture, and velocity may be used in manners readily apparent to those skilled in the art.

In one embodiment, player tracking may run at 30 frames per second on a single processor such as an SGI MIPS R1000 or a Pentium III. However, the system is not limited to any particular processor.

IV. Tracking Motion of Object (Non-Person)

Again, depending on the domain, objects other than people need to be tracked in accordance with the IIMD system. In a surveillance domain, this may include cars in a parking lot, items that individuals are carrying (e.g., briefcases, weapons). While the tennis embodiment specifically focuses on tennis ball tracking, it is to be understood that the tracking techniques described below may be applied to other domains.

Tracking of ball motion may be accomplished in a variety of ways. As mentioned above, ball motion tracking may be performed in accordance with the techniques described in the above-referenced U.S. Pat. No. 6,233,007, and in the above-referenced U.S. patent application identified as Ser. No. 10/062,800 filed Jan. 31, 2002 and entitled "Real Time Method and Apparatus for Tracking a Moving Object Experiencing a Change in Direction." However, other methodologies may be used. A description is given below of a preferred methodology for performing ball motion tracking operations that may be implemented by the real time tracking module 212 of the IIMD system 200.

Tracking of certain items can be challenging. In the case of a tennis ball, the challenge is due to the small size of the ball (67 millimeters in diameter), the relatively long distances it travels (over 26 meters), the high speeds at which it travels (the fastest serves are over 225 kilometers per hour), changing lighting conditions, especially in outdoor events, and varying contrast between the ball and the background across the scene. Other domains, such as security applications, present similar as well as different challenges where, for example, luggage may have different colors, sizes, and shapes.

A. System Design and Configuration

In a preferred embodiment of an IIMD system, the ball tracking system uses six monochrome progressive scan (60 Hertz) cameras connected to a quad-pentium workstation with a dual PCI bus. Experiments have been performed on image resolution and found that a ball has to appear with a diameter of at least 10 pixels for reliable detection. Based on this, six progressive scan cameras with 640×480 pixels are used. The cameras cover the volume of the court and capture images with temporal resolution sufficient for ball tracking and spatial resolution sufficient for identifying the ball. Monochrome cameras make the bandwidth of a dual PCI bus sufficient for concurrent full-frame capture at 60 Hz from all six cameras. Cameras with higher speed and resolution, as well as color capability, could be used.

The six cameras are placed around a stadium (in which the tennis match is being played) with four cameras on the side and two at the ends of the court. Each of the four side cameras is paired with one of the end cameras to form a set of four stereo pairs that track the ball in 3D. Auto-iris lenses adjust to large lighting changes in the course of a day. Additionally, tracking parameters are dynamically updated, as explained below in subsection C.

B. Multi-Threaded Tracking

Figure 4:
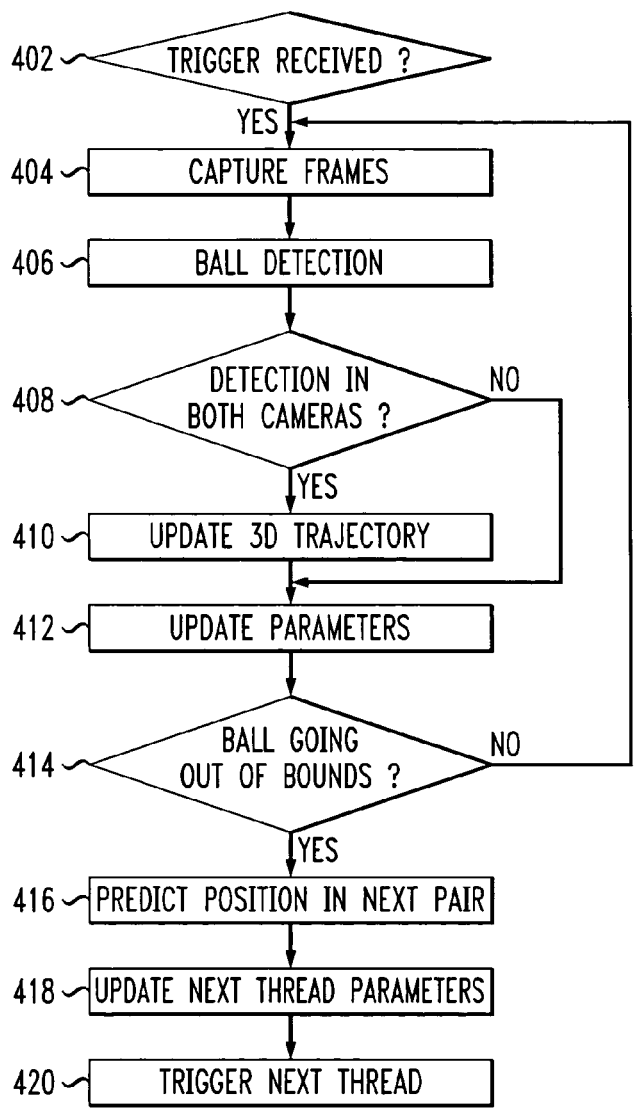
FIG. 4 is a flow diagram illustrating a ball tracking method according to an embodiment of the present invention.

Multi-threaded tracking achieves an efficient solution that is scalable and works with distributed computing resources. Each camera pair has an associated processing thread. FIG. 4 gives an overview of the processing steps in each thread.

Referring now to FIG. 4, a flow diagram illustrates a ball tracking method 400 according to an illustrative embodiment. In step 402, a thread waits for a trigger signal to start frame capture and processing. Each thread has the following set of parameters: a trigger to start processing, a pair of associated cameras, calibration parameters of each camera, difference image thresholds, ball size parameters, expected intensity range for the ball, expected ball position in each image, size of the search window in each image, a trigger signal for the subsequent processing thread, and a pointer to the parameters of the subsequent thread.

Prior to a match, the cameras may be calibrated in accordance with the above-referenced R. Y. Tsai article, taking advantage of the calibration grid provided by the court itself.

On receiving its trigger, a thread executes a loop of capturing frames from the camera pair (step 404), detecting the ball in the captured frames (step 406), stereo matching and updating the 3D trajectory (steps 408 and 410) and tracking parameters (step 412), until the ball goes out of view of any one of its associated cameras (step 414). At that time, the current thread predicts the ball position (step 416) and initializes the parameters for the thread (step 418) corresponding to the subsequent camera pair and then triggers that thread (step 420).

This multi-threaded approach scales in a straightforward manner to any number of cameras tracking an object over a large area. With a few modifications, the approach also scales to tracking multiple objects with multiple cameras. In this case, a thread associated with a camera pair (or set of cameras) has triggers associated with each object. The thread tracks an object when it receives a trigger signal corresponding to the object. Different tracking schemes can be used by a thread for different types of objects.

C. Ball Segmentation and Detection

The IIMD system detects and segments the ball in an image by frame differencing the current and previous images and thresholding the result, finding the regions in the current image that lie in the expected intensity range for the ball, performing a logical AND operation of the regions obtained from the preceding two steps, subjecting the resulting regions to size and shape (circularity) checks, and choosing the detection closest to the expected position in the (rare) case of multiple detections. All these operations are performed only in a window defined by the expected ball position and search size parameters. Most parameters, such as the range of intensity values, expected size of the ball, size of the search window, and the differencing threshold, are dynamically updated during the course of tracking. The expected ball position is continually updated based on the current velocity of the ball.

Parameters such as the search size and range of intensity values are initially set to conservative values. The direction of the serve identifies and triggers the first thread. This thread initially has no expected ball position but a relatively large search window. The system searches for the ball in only one of the two camera feeds to ensure efficiency. Once the ball is detected in one camera, epipolar constraints determine the search region in the other camera.

Once tracking commences, the search regions become much smaller and images from both cameras are used to detect the ball. When the current velocity of the ball indicates that the ball will be out of bounds of the current camera pair by the next frame, the current 3D ball velocity and world to image mapping determine the positions of the ball in the next camera pair. Thus, once the initial thread starts tracking, subsequent threads look for the ball in well-defined search windows. The dynamic update of segmentation and tracking parameters are important parameters for use by the system.

D. Landing Spot Determination

Analysis of the 3D ball trajectory, with appropriate interpolation, yields the ball landing spot for each serve. If the 3D trajectory of length n has time samples $(t_1, t_2, \ldots, t_n)$, and the time sample $t_c$ represents the last sample with a negative z velocity (computed from time $t_{c-1}$ to $t_c$), then the landing spot is at a time $t_l$ which is either between $t_c$ and $t_{c+1}$ or between $t_{c-1}$ and $t_c$. In the first case, forward projection from the 3D velocity and acceleration parameters at time $t_c$ determine when the ball reaches the ground. In the second case, backward projection from the velocity and acceleration parameters at time $t_{c+1}$ determine the landing location and time. The system chooses one depending on how well the velocity at the interpolated position matches the velocity at the tracked positions. Experiments show that the choice is unambiguous. Further refinement on the landing spot determination as well as determination when the ball hits the racket are described in the above-referenced U.S. patent application identified as Ser. No. 10/062,800 filed Jan. 31, 2002 and entitled "Real Time Method and Apparatus for Tracking a Moving Object Experiencing a Change in Direction."

V. Query and Visualization Interface

As first described above in the context of FIG. 1, the IIMD system provides a user with query and visualization access to the data stored in the storage block 106 via a query and visualization interface 120. It is to be understood that the query and visualization mechanism may be implemented in a variety of ways and again depends on the problem domain.

To query and visualize data associated with the relational data structure of the IIMD, SQL (Standard Query Language) techniques may preferably be employed. In order to query and visualize data associated with the spatio-temporal data structure of the IIMD, techniques disclosed in the U.S. patent application identified as Ser. No. 10/167,539 and entitled "Method and Apparatus for Retrieving Multimedia Data Through Spatio-Temporal Activity Maps;" and the U.S. patent application identified as Ser. No. 10/167,533 and entitled "Performance Data Mining Based on Real Time Analysis of Sensor Data," may be used. However, other query and visualization techniques may be used.

In general, once an event is stored in a database in the form of motion trajectories and domain-specific labels, the viewer (user) can explore a virtual version of the event. This can be done even during a live event. To cope with the sheer volume of captured data, a powerful mechanism of data selection allows the user to choose only the subset of interest. Again, the data selection interface is domain specific. Examples in the tennis domain are given in the above-referenced patent applications identified as Carlbom 8-1-8 and Carlbom 10-7-3-10. It is to be understood that the IIMD system is in no way intended to be limited to any one domain-specific interface.

Further, in general, the selection procedure of the interface allows the user to formulate a wide variety of queries, e.g., score-based queries, statistics-based queries, space-based queries and hybrid spatio-temporal queries. In addition, the IIMD system supports historical queries.

It is to be appreciated that given the particular parameters of the application with which the IIMD system is being implemented, one of ordinary skill in the art will realize various query and visualization interface formats and implementations that can access the instantly indexed multimedia data stored in the IIMD system.

After selecting a data subset, the user may be given a set of tools via the visualization block 108 (FIG. 1) for viewing and analysis. A virtual mixing console may be employed to facilitate visualization selection, smooth transition between different visualizations, and combination of several visualizations. Selected visualizations share space in a visualization window. Any new type of visualization can be easily added to this scheme. Examples of some visualizations include maps, charts and virtual replays.

VI. Content Based Video Retrieval

Again, as first described above in the context of FIG. 1, the IIMD system provides a user with a retrieval mechanism for accessing the data stored in the storage block 106 via a query and visualization interface 120. It is to be understood that the retrieval mechanism may be implemented in a variety of ways and again depends on the domain.

The IIMD system preferably implements the concept of "activity maps based indexing" of video by combining the data selection power and the visualization power discussed above. Activity maps are described in detail in the above-referenced U.S. patent application identified as Ser. No. 10/167,539 and entitled "Method and Apparatus for Retrieving Multimedia Data Through Spatio-Temporal Activity Maps." Other retrieval methods may be used.

In general, such spatio-temporal activity maps enable a user to view summaries of activity and discover interesting patterns. The user can then retrieve interesting video clips by using the activity maps as a graphical user interface to the video and other parameters.

To enable activity map based indexing, the IIMD system preferably provides a media browser in conjunction with a map interface. The spatio-temporal activity maps are different types of overlays on a 3D model of the event environment (e.g., tennis court, parking garage, supermarket). Users may select specific regions of the event environment corresponding to areas or activities of interest and may also modify their choices for events and mapping schemes to further refine their selection. Simultaneously, the media browser gives the user access to the corresponding video.

VII. Exemplary Hardware Implementation

Figure 5:
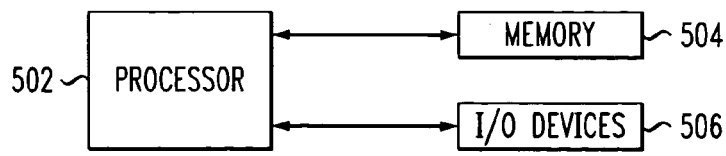
FIG. 5 is a block diagram illustrating a generalized hardware architecture of a computer system suitable for implementing one or more functional components of an instantly indexed multimedia database system according to the present invention.

Referring finally to FIG. 5, a block diagram illustrates a generalized hardware architecture of a computer system suitable for implementing one or more of the functional components of the IIMD system as depicted in the figures and explained in detail herein. It is to be understood that the individual components of the IIMD system, e.g., as illustrated in FIGS. 1 and 2A, may be implemented on one such computer system, or more preferably, on more than one such computer system. In the case of an implementation on a distributed computing system, the individual computer systems and/or devices may be connected via a suitable network, e.g., the Internet or World Wide Web. However, the system may be realized via private or local networks. The IIMD system is not limited to any particular network. Also, the components of the system may be implemented in a client/server architecture, e.g., query and visualization block and access block (FIGS. 1 and 2A) are implemented on one or more client devices, while the capture block and the storage block (FIGS. 1 and 2A) are implemented on one or more servers. Thus, the computer system depicted in FIG. 5 represents a client device or a server.

As shown, the computer system may be implemented in accordance with a processor 502, a memory 504 and I/O devices 506. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. The memory 504 includes the memory capacity for implementing the storage block (e.g., 106 in FIG. 1 or 206 in FIG. 2A). In addition, the term "input/output devices" or "I/O devices" as used herein is intended to include, for example, one or more input devices (e.g., cameras, microphones, keyboards, etc.) for entering data to the processing unit, and/or one or more output devices (e.g., speaker, display, etc.) for presenting results associated with the processing unit. It is also to be understood that the term "processor" may refer to more than one processing device and that various elements associated with a processing device may be shared by other processing devices. Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Accordingly, as described herein in detail, an IIMD system represents a new paradigm of multimedia databases that converts real world events in real time into a form that enables a new multimedia experience for remote users. Components of the experience include: (i) immersion in a virtual environment where the viewer can choose to view any part of the event from any desired viewpoint and at any desired speed; (ii) the ability to visualize statistics and implicit information that is hidden in media data; (iii) the ability to search for, retrieve, compare and analyze content including video sequences, virtual replays and a variety of new visualizations; and (iv) the ability to access this information in real time over diverse networks. The system achieves these and other advantages in accordance with the architecture and design principles detailed herein, especially incorporating domain knowledge such as event hierarchy, rules of the event, environment model, and sensor parameters.

B. Sensor Controller Architecture

Figure 6:
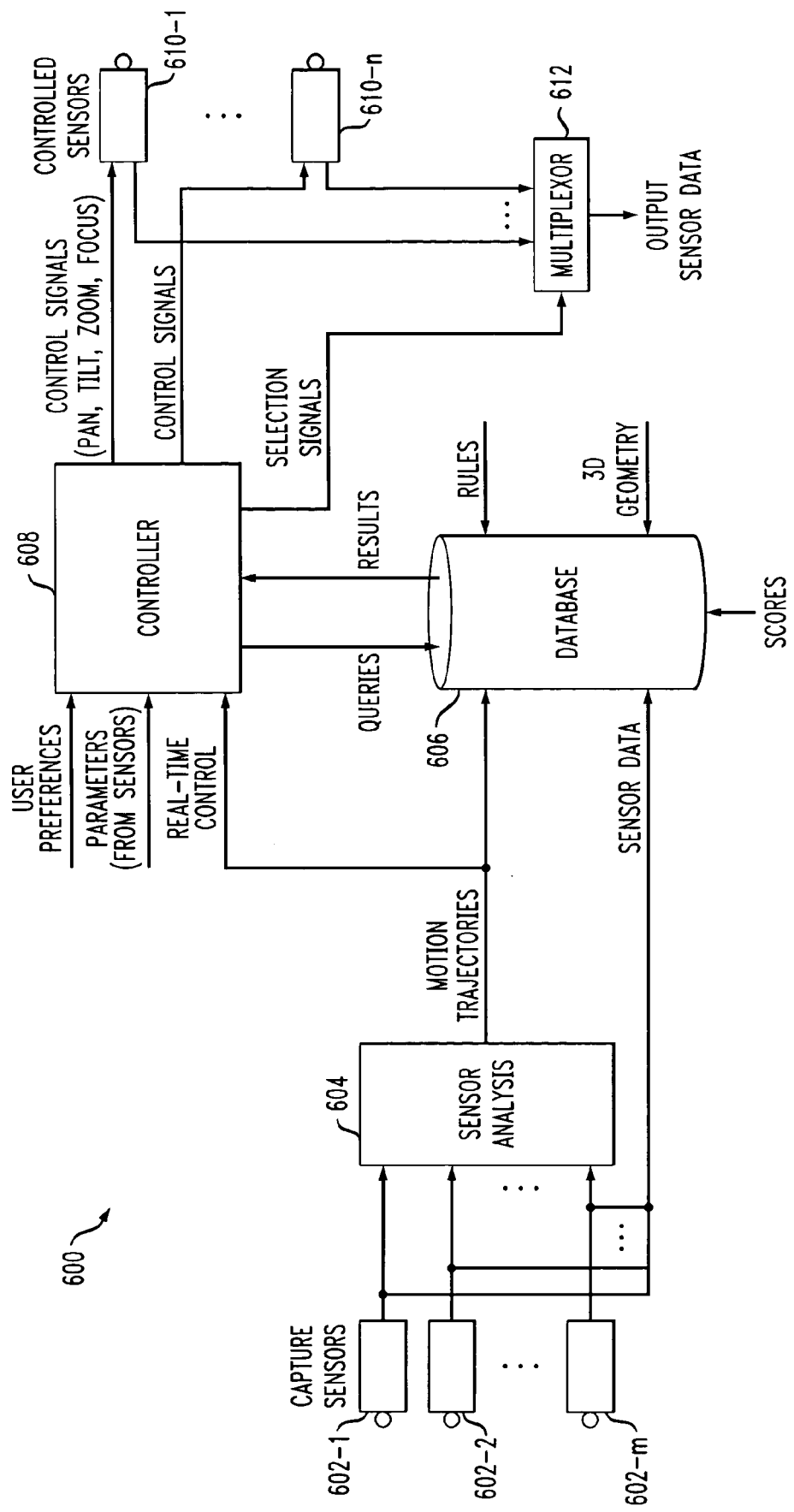
FIG. 6 is a block diagram illustrating a sensor controller architecture according to an embodiment of the present invention that may be employed in a multimedia database system.

Referring now to FIG. 6, a block diagram illustrates a sensor controller architecture according to an embodiment of the present invention that may be employed in conjunction with a multimedia database system. By way of example, the sensor controller architecture may preferably be employed in conjunction with an IIMD system, as described above. However, the sensor controller architecture of the invention may be employed with a variety of other systems and is, therefore, not limited to an IIMD system.

As shown, the sensor controller system 600 comprises capture sensors 602-1 through 602-*m*, a sensor analysis module 604, a database 606, a controller 608, controlled sensors 610-1 through 610-*n*, and a multiplexor 612. In the context of an IIMD system, such as the IIMD embodiment of FIG. 2A (although the more generalized IIMD architecture of FIG. 1 could be used), it is to be appreciated that the capture sensors 602-1 through 602-*m*, the controlled sensors 610-1 through 610-*n*, and the multiplexor 612 may be part of the camera system 202. Also, the sensor analysis module 604 may be implemented via the real-time tracking module 212, and the database 606 may be implemented via the database 206. Thus, the sensor controller architecture may be realized in accordance with the IIMD system 200 by providing the IIMD system 200 with controller 608 for controlling the sensor manipulation functions described herein. Also, while capture sensors 602 and controlled sensors 610 are shown separately, it is to be appreciated that these sensors may be the same.

Further, while the components of FIG. 6 may preferably be implemented in accordance with the same processor(s) as the IIMD system, alternatively, the sensor controller 608 may be implemented via one or more separate processors. In any case, the sensor controller architecture 600 of the invention may be implemented via the computer system illustrated and described above in the context of FIG. 5.

The principles of the present invention realize that real-time tracking data, associated with a system such as an instantly indexed database system, can be used not only to query for and retrieve multimedia data, but also to actively control cameras and other sensors to track and effectively display the most interesting action in a real time event. Thus, the invention incorporates a sensor controller in conjunction with a database system such as the IIMD system.

Advantageously, the controller 608 is able to switch between sensors (e.g., cameras) and control individual sensors to: (a) follow (i.e., track) an object of interest; (b) follow the natural course of action (e.g., in a tennis application, the system can select a serving style, zoom-in from an end camera, followed by another camera which shows one player and the ball and which tracks the ball, and then switch to a camera from the other end to show the other player and the ball); (c) predict interesting events and display them effectively as they happen (for example, the system can predict that the ball will be landing close to the line and, therefore, zoom in an appropriate camera as the ball lands). By way of further example, in a security application, the controller 608 can control one or more sensors to zoom in on unusual activity or track a suspected perpetrator, providing close-up views of the suspected perpetrator and his or her activities.

The controller 608 is able to accomplish these tasks by making use of the data available in the database 606. For example, it is assumed that the database 606 is populated with the data collected and stored in accordance with database 206 of FIG. 2A (or, more generally, database 106 of FIG. 1). Thus, the controller has available raw sensor data collected from sensors 602-1 through 602-*m* of the objects, persons and environment that are being captured thereby, real-time control data such as motion trajectories generated in accordance with sensor analysis module 604 (as described above in the context of analysis/tracking modules 112 and 212), 3D geometry data modeling the environment being monitored, and rules data relating to the activities being monitored. Other data may be available to the controller. With this information, as may be obtained from the database 606 by the controller 608 via query/result operations, the controller is able to control (via control signals) sensors 610-1 through 610-*n* in order to capture desired information associated with the real-time event being monitored by the system. Also, as shown in FIG. 6, real-time data can be provided directly to the controller 608 from the sensor analysis module 604. Still further, parameter data associated with the sensors can also be provided directly to the controller.

Advantageously, the invention achieves much faster and smoother control of sensors (e.g., cameras) than is possible by human beings. The invention can also be combined with manual systems to semi-automate broadcast direction and production. In addition, the controller can be set to automatically follow preferences of individual viewers or directors. For example, in the tennis context, the system can follow an individual's preference on whether to show a winner or a loser of a point, and also for the type of viewpoint. Situated in a broadband network, the controller can, in real time, provide different video productions to different users based on their individual preferences. In surveillance (e.g., airport), a security guard may select an individual to be tracked, either by pointing or by specifying behavior that is cause for further tracking.

The controller 608 thus takes full advantage of both the knowledge of the domain that is stored in the IIMD system, as well as the real-time motion trajectory data available during live action. In effect, the system knows where the people and objects of interest are at all times, what the people are doing, what their actions mean in the environment, and where the sensors are located. The system is also aware of who are the persons or objects close to any other person or object. The controller is aware of the positions and orientations of all sensors in its real world environment, and the calibration parameters for mapping between real world coordinates and sensor/image coordinates. As mentioned, the controller 608 is also aware of the 3D geometry of the environment, the rules of the domain, and the typical actions performed in the domain. Some of this information may also be pre-stored in the controller memory.

In the context of a tennis application, the controller 608 keeps track of known events such as scores, record breaking performances, etc. Also, the controller 608 keeps track of the motion and actions performed by people and other objects in the environment (e.g., players and ball), in real-time. The controller is thus aware at every instant of who is where, doing what, and seen in which way by each available camera.

This provides sufficient information to the controller 608 to switch between cameras to show the appropriate portion of the action. The controller 608 preferably has a programmer interface that allows different preferences to be set. The invention also includes instrumentation on each camera to provide camera motion parameters to the controller in real-time. By way of example, the instrumentation may be of the type described in Kato et al., "Development of a High-Performance Camera-Control Device and Its Application to TV Programs," SMPTE Journal, pp. 708-723, October 1999, the disclosure of which is incorporated by reference herein. The controller 608 also sends pan, tilt, zoom and focus signals to the cameras (via control signals) based on its intelligent analysis. The controller 608 also provides selection signals to video multiplexor 612 to determine which of the video streams from multiple cameras 610-1 through 610-*n* is incorporated into a production stream.

Referring now to FIG. 7, a flow diagram illustrates a sensor control methodology according to an embodiment of the present invention. It is to be appreciated that, by way of example, methodology 700 of FIG. 7 may be implemented in accordance with controller 608 of FIG. 6. Thus, while the methodology is not necessarily intended to be limited to the architecture of FIG. 6, the description below will make reference to controller 608 (assumed to be accessible by a user), as well as other components of FIG. 6.

It is assumed that a set of people and/or objects (e.g., cars, briefcases, containers) are moving in a scene, such as a sports field, an airport, a parking garage, a highway, or a sea port. Sensors (e.g., 602-1 through 602-*m* and 610-1 through 610-*n*) such as, for example, cameras, microphones, infrared sensors, are placed in the environment. Some sensors give an overview of the scene, while others are meant to be steered for close-up of an object of interest. The overview sensors track the location of all objects and persons in the scene. It is also assumed that data, for example, as described herein, has previously been captured and stored in database 606.

Input to controller 608 may fall into two categories: (1) specification regarding desired object or person to track with a sensor or a set of sensors; and (2) specification regarding desired "views."

An object or person can be selected in a variety of ways. For example, an object or person can be selected by:
  a. name or number (on jersey or on container);
  b. interactive identification, that is, a user points at a screen to a person/object that the user wants to follow; and/or
  c. a reasoning subsystem which finds the person/object of interest based on some criteria. Some examples may be:
    i. a winning player;
    ii. a person acting suspiciously, deviating from "normal" behavior, such as walking in strange ways in an airport, trying to enter several cars in a garage, leaving a car in front of building and walking away instead of entering, or leaving a briefcase and walking away; and/or
    iii. a speeding vehicle.

The user may specify the types(s) of sensor, e.g., camera or microphone, that are used for close-up "views." The user may also specify the type of "view," that is, a profile and/or a frontal view of a person, a close-up of a container (from any direction), or listen to what a person says to another. This information (referred to in FIG. 6 as "user preferences") is used by controller 608 to assist in selecting the appropriate sensor(s) and determining how to control the sensor(s). Referring now to the steps of methodology 700 (it is to be understood that even though the term "object" is used alone in FIG. 7, as made evident below, the same operations apply to a "person" of interest):

Step 701: It is assumed that the user has identified (e.g., pointed to) an object or person on a display screen. The object or person has some two dimensional (2D) screen coordinate associated therewith. The user may also select an audio track. In order to map the 2D screen coordinate of the selected object or person, controller 608 first accesses camera calibration data. This data may be accessed from database 606.

Step 702: Using the calibration data and the camera location, controller 608 maps the 2D point into a three dimensional (3D) ray in the scene, that is, a line from the virtual (assumed) eye-point to the object or person.

Step 703: Controller 608 finds the object or person trajectory that is intersected by the 3D ray. This is the trajectory of the object or person of interest. Again, this data may be accessed from database 606. This may occasionally yield more than one trajectory. Standard graphical user interface techniques, know to those of ordinary skill in the art, can be used to disambiguate the tracks.

Step 704: Using the last point on the selected trajectory, that is, the current location of the object or person of interest, controller 608 finds all neighboring objects or persons, that is, the objects or persons whose current trajectory points are near the object or person of interest.

Step 705: Using the last few (e.g., minimum of two) trajectory points, the controller 608 predicts the next location of the object or person of interest and also the next location of all surrounding objects or persons by drawing lines or curves through the last two or more points on each of the trajectories, and extending the lines or curves beyond the last position on the trajectories in the directions of the movement. The speed and acceleration at which the persons or objects are moving determines the predicted point on the trajectories.

Step 706: From database 606, controller 608 gets location and properties (e.g., field of view) of all sensors in the environment. Using the view preferences entered by the user, the predicted location of the object or person of interest, and the sensor locations and properties, controller 608 derives a list of potential sensors (e.g., sensors 610) that can give the desired view(s) of the object/person of interest at the predicted location, in priority order. First in the list is the sensor that will give the best view. By way of example, the "best view" determination may identify the sensor closest to the object or person, given the desired view. Note that several lists of sensors may be created, e.g., one for each desired view.

Step 707: Controller 608 modifies the priority order based on occlusion, that is, if any of the surrounding objects or people would block (e.g., occlude) the view of the sensors in the list. By way of example, the best view may now be a partial view close up or a full view from a more distant sensor. Note that just as an object or person may block the view from a camera, a noisy object or person may interfere with a microphone.

Step 708: Controller 608 selects the best sensor, or sensors if multiple views are required, e.g., one for side view, one for front view.

Step 709: Controller 608 causes the best sensor (for each view) to be steered towards the predicted location of the object or person of interest. This is accomplished via one or more control signals sent to the sensor, e.g., pan, tilt, zoom, focus signals for a camera, and/or directional signals for a microphone.

Step 710: Controller 608 then determines true (actual) new position for the object or person of interest. The methodology then returns to step 704 and repeats steps 704 through 710 to track the next location of the object or person of interest.

Step 711: A reasoning subsystem (i.e., part of controller 608 or a stand alone automated system) may detect a specific behavior of an object or a person that is of interest. The reasoning may be spatial or temporal, or a combination of both.

Spatial reasoning determines the relationship of an object or person relative to the 3D environment of the real time event. By way of example, spatial reasoning may determine where a person is located, that the object or person may be too close to a specified area or facing the wrong direction. Spatial reasoning also determines the relationships of an object or person relative to other persons or objects. By the way of example, a person comes in contact with another person or object. Note that input to the spatial reasoning process could come from sensor analysis module 604, that is, it could be the result of tracking of an object or individual. Also, the behavior to be detected may be previously specified by the user. By way of example, the user may specify a criteria such as "a truck pulls up in front of a building (track for truck ends in front of building), the driver exits (new person track starts from truck), another truck pulls up in front of building (track for truck ends in front of building), the driver of first truck enters second truck (the driver track ends at the second truck), and the second truck leaves (the truck track starts again)."

Temporal reasoning may determine the relationship between an object or person and some historical data. By way of example, a player may be the first to hit a certain number of home runs. Temporal reasoning may also determine at what speed, acceleration, or direction a person or object is moving, or a specific sequence of actions at certain times. By way of example, the person/player is running at a certain speed, or a person entering a secure area after hours. Temporal reasoning may also predict where the object/person is heading in the event. By way of example, the serve of a tennis ball may be headed for the baseline. Note that input to the temporal reasoning process could come from sensor analysis module 604, that is, it could be the result of tracking of an object or individual. Also, the behavior to be detected may be previously specified by the user.

The result of step 711 is a name or identifier.

Step 712: Controller 608 finds the trajectory corresponding to the object or person with a specific name or number (i.e., specified directly by the user or specified by the reasoning subsystem). Then, steps 704 through 710 are performed, as explained above.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A method of controlling one or more sensors used to capture data associated with an event, the method comprising the steps of:
   processing sensor data captured in accordance with the event; and
   automatically controlling the one or more sensors based on information pertaining to a continual activity of at least one of one or more objects and one or more persons associated with the event in real time obtained using at least a portion of the processed data captured in accordance with the event;
   wherein the step of automatically controlling the one or more sensors further comprises obtaining one or more user preferences, wherein the one or more user preferences comprise at least a view preference and at least one of an object or person preference and an object or person behavior preference,
   wherein a reasoning subsystem is used to identify a behavior specified by the object or person behavior preference when the one or more user preferences comprise the object or person behavior preference, whereby the reasoning subsystem is adapted to conclude that a first detected action of at least one of the object and the person followed by at least a second detected action of at least one of the object and the person comprise the specified behavior when the first detected action or the second detected action alone would not comprise the specified behavior but when detected together as part of a continual activity comprise the specified behavior,
   wherein the view preference comprises a user-specified priority of one or more view types and one or more sensor types, and
   wherein the step of automatically controlling the one or more sensors further comprises: selecting a view type and sensor type based on the user-defined priority of view types; and responsive to determining that at least one of the selected view type and the preferred sensor type is obstructed, selecting another view type or preferred sensor type.

2. The method of claim 1, wherein the step of automatically controlling the one or more sensors further comprises utilizing the one or more user preferences in conjunction with at least a portion of the activity information to generate one or more signals for controlling the one or more sensors.

3. The method of claim 1, wherein the step of automatically controlling the one or more sensors further comprises identifying a two dimensional display screen coordinate corresponding to the object or person specified by the object or person preference.

4. The method of claim 1, wherein the step of automatically controlling the one or more sensors further comprises specifying an identifier corresponding to the object or person specified by the object or person preference.

5. The method of claim 1, wherein the step of automatically controlling the one or more sensors further comprises analyzing a spatial behavior corresponding to the object or person specified by the behavior preference.

6. The method of claim 1, wherein the step of automatically controlling the one or more sensors further comprises analyzing a spatial behavior relating to the surrounding three dimensional environment for the object or person specified by the behavior preference.

7. The method of claim 1, wherein the step of automatically controlling the one or more sensors further comprises analyzing a spatial behavior relating to one or more surrounding objects in the environment for the object or person specified by the behavior preference.

8. The method of claim 1, wherein the step of automatically controlling the one or more sensors further comprises analyzing a temporal behavior corresponding to the object or person specified by the behavior preference.

9. The method of claim 1, wherein the step of automatically controlling the one or more sensors further comprises specifying a temporal behavior relating to historical data for the object or person specified by the behavior preference.

10. The method of claim 1, wherein the step of automatically controlling the one or more sensors further comprises specifying a temporal behavior relating to at least one of the speed, acceleration, and direction of the object or person specified by the behavior preference.

11. The method of claim 1, wherein the step of automatically controlling the one or more sensors further comprises specifying a temporal behavior relating to the time of actions of the object or person specified by the behavior preference.

12. The method of claim 1, wherein the step of automatically controlling the one or more sensors further comprises specifying a temporal behavior relating to prediction of location of the object or person specified by the behavior preference.

13. The method of claim 1, wherein the step of automatically controlling the one or more sensors further comprises obtaining a motion trajectory corresponding to the object or person specified by the object or person preference.

14. The method of claim 13, wherein the step of automatically controlling the one or more sensors further comprises finding one or more objects or persons in a neighborhood of the object or person specified by the object or person preference.

15. The method of claim 14, wherein the step of automatically controlling the one or more sensors further comprises predicting the next locations of the object or person specified by the object or person preference and of the one or more neighboring objects or persons, using respective motion trajectories.

16. The method of claim 15, wherein the step of automatically controlling the one or more sensors further comprises selecting at least one sensor for capturing data associated with the object or person specified by the object or person preference at its predicted next location, based on the view preference and at least a portion of the processed, captured data.

17. The method of claim 16, wherein the step of automatically controlling the one or more sensors further comprises determining whether any of the neighboring objects or persons block the view of the at least one selected sensor.

18. The method of claim 17, wherein the step of automatically controlling the one or more sensors further comprises directing the at least one selected sensor to the predicted next location of the object or person specified by the object or person preference, when not blocked or only partially blocked by any of the neighboring objects or persons.

19. The method of claim 18, wherein the step of automatically controlling the one or more sensors further comprises determining the actual position of the object or person specified by the object or person preference.

20. The method of claim 1, wherein the one or more sensors are associated with a multimedia database system.

21. Apparatus for controlling one or more sensors used to capture data associated with an event, the apparatus comprising:
 a memory; and
 at least one processor coupled to the memory and operative to: (i) obtain processed sensor data captured in accordance with the event; and (ii) automatically control the one or more sensors based on information pertaining to a continual activity of at least one of one or more objects and one or more persons associated with the event in real time obtained using at least a portion of the processed data captured in accordance with the event;
 wherein the operation of automatically controlling the one or more sensors further comprises obtaining one or more user preferences, wherein the one or more user preferences comprise at least a view preference and at least one of an object or person preference and an object or person behavior preference,
 wherein a reasoning subsystem is used to identify a behavior specified by the object or person behavior preference when the one or more user preferences comprise the object or person behavior preference, whereby the reasoning subsystem is adapted to conclude that a first detected action of at least one of the object and the person followed by at least a second detected action of at least one of the object and the person comprise the specified behavior when the first detected action or the second detected action alone would not comprise the specified behavior but when detected together as part of a continual activity comprise the specified behavior,
 wherein the view preference comprises a user-specified priority of one or more view types and one or more sensor types, and
 wherein the operation of automatically controlling the one or more sensors further comprises: selecting a view type and sensor type based on the user-defined priority of view types; and responsive to determining that at least one of the selected view type and the preferred sensor type is obstructed, selecting another view type or preferred sensor type.

22. The apparatus of claim 21, wherein the operation of automatically controlling the one or more sensors further comprises utilizing the one or more user preferences in conjunction with at least a portion of the activity information to generate one or more signals for controlling the one or more sensors.

23. The apparatus of claim 21, wherein the operation of automatically controlling the one or more sensors further comprises identifying a two dimensional display screen coordinate corresponding to the object or person specified by the object or person preference.

24. The apparatus of claim 21, wherein the operation of automatically controlling the one or more sensors further comprises specifying an identifier corresponding to the object or person specified by the object or person preference.

25. The apparatus of claim 21, wherein the operation of automatically controlling the one or more sensors further comprises obtaining a motion trajectory corresponding to the object or person specified by the object or person preference.

26. The apparatus of claim 21, wherein the one or more sensors are associated with a multimedia database system.

27. An article of manufacture for controlling one or more sensors used to capture data associated with an event, comprising a machine readable medium containing one or more programs which when executed implement the steps of:
 processing sensor data captured in accordance with the event; and
 automatically controlling the one or more sensors based on information pertaining to a continual activity of at least one of one or more objects and one or more persons associated with the event in real time obtained using at least a portion of the processed data captured in accordance with the event;
 wherein the operation of automatically controlling the one or more sensors further comprises obtaining one or more user preferences, wherein the one or more user preferences comprise at least a view preference and at least one of an object or person preference and an object or person behavior preference,
 wherein a reasoning subsystem is used to identify a behavior specified by the object or person behavior preference when the one or more user preferences comprise the object or person behavior preference, whereby the reasoning subsystem is adapted to conclude that a first detected action of at least one of the object and the person followed by at least a second detected action of at least one of the object and the person comprise the specified behavior when the first detected action or the second detected action alone would not comprise the specified behavior but when detected together as part of a continual activity comprise the specified behavior,
 wherein the view preference comprises a user-specified priority of one or more view types and one or more sensor types, and
 wherein automatically controlling the one or more sensors further comprises: selecting a view type and sensor type based on the user-defined priority of view types; and responsive to determining that at least one of the selected view type and the preferred sensor type is obstructed, selecting another view type or preferred sensor type.

* * * * *